(12) United States Patent
Cai et al.

(10) Patent No.: US 11,100,310 B2
(45) Date of Patent: Aug. 24, 2021

(54) OBJECT THREE-DIMENSIONAL DETECTION METHOD AND APPARATUS, INTELLIGENT DRIVING CONTROL METHOD AND APPARATUS, MEDIUM AND DEVICE

(71) Applicant: BEIJING SENSETIME TECHNOLOGY DEVELOPMENT CO., LTD., Beijing (CN)

(72) Inventors: Yingjie Cai, Beijing (CN); Xingyu Zeng, Beijing (CN); Junjie Yan, Beijing (CN); Xiaogang Wang, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/259,678

(22) PCT Filed: Jul. 16, 2019

(86) PCT No.: PCT/CN2019/096232
§ 371 (c)(1),
(2) Date: Jan. 12, 2021

(87) PCT Pub. No.: WO2020/029758
PCT Pub. Date: Feb. 13, 2020

(65) Prior Publication Data
US 2021/0165997 A1   Jun. 3, 2021

(30) Foreign Application Priority Data
Aug. 7, 2018   (CN) .......................... 201810891535.0

(51) Int. Cl.
*G06T 7/73* (2017.01)
*G06T 7/50* (2017.01)
(Continued)

(52) U.S. Cl.
CPC ..... *G06K 9/00208* (2013.01); *G06K 9/00805* (2013.01); *G06K 9/2054* (2013.01);
(Continued)

(58) Field of Classification Search
CPC .......... G06K 9/00208; G06K 9/00805; G06K 9/00818; G06K 9/2054; G06K 2209/23;
(Continued)

(56) References Cited

U.S. PATENT DOCUMENTS

| | | | |
|---|---|---|---|
| 2003/0099409 A1* | 5/2003 | Rowe | G06T 17/10 382/285 |
| 2006/0061569 A1* | 3/2006 | Yamada | H04N 13/261 345/422 |
| 2009/0041337 A1 | 2/2009 | Nakano | |

FOREIGN PATENT DOCUMENTS

| | | |
|---|---|---|
| CN | 101915573 A | 12/2010 |
| CN | 102262724 A | 11/2011 |

(Continued)

OTHER PUBLICATIONS

J. Lee, S. Yoo, C. Kim and B. Vasudev, "Estimating Scene-Oriented Pseudo Depth With Pictorial Depth Cues," in IEEE Transactions on Broadcasting, vol. 59, No. 2, pp. 238-250, Jun. 2013 (Year: 2013).*

(Continued)

*Primary Examiner* — Michael J Vanchy, Jr.
(74) *Attorney, Agent, or Firm* — Cooper Legal Group, LLC

(57) ABSTRACT

Disclosed in embodiments of the present disclosure are an object three-dimensional detection method and apparatus, an intelligent driving control method and apparatus, a medium, and a device. The object three-dimensional detection method comprises: obtaining two-dimensional coordinates of a key point of a target object in an image to be processed; constructing a pseudo three-dimensional detection body of (Continued)

the target object according to the two-dimensional coordinates of the key point; obtaining depth information of the key point; and determining a three-dimensional detection body of the target object according to the depth information of the key point and the pseudo three-dimensional detection body.

20 Claims, 5 Drawing Sheets

(51) Int. Cl.
    *G06K 9/00*         (2006.01)
    *G06K 9/20*         (2006.01)

(52) U.S. Cl.
    CPC ............... *G06T 7/50* (2017.01); *G06T 7/73* (2017.01); *G06K 9/00818* (2013.01); *G06K 2209/23* (2013.01)

(58) Field of Classification Search
    CPC ......... G06K 9/00798; G06T 7/50; G06T 7/73; G06T 13/00; G06T 15/005; G06T 2210/44
    See application file for complete search history.

(56) References Cited

FOREIGN PATENT DOCUMENTS

| | | |
|---|---|---|
| CN | 102901446 A | 1/2013 |
| CN | 108038902 A | 5/2013 |
| CN | 104021368 A | 9/2014 |
| CN | 106251395 A | 12/2016 |
| CN | 107203962 A | 9/2017 |
| EP | 2772883 A2 | 9/2014 |
| EP | 2772883 A3 | 3/2016 |
| EP | 2772883 B1 | 10/2018 |

OTHER PUBLICATIONS

International Search Report and English Translation of the International Search Report in the international application No. PCT/CN2019/096232, dated Sep. 26, 2019, 7 pages.

Written Opinion and English translation of the Written Opinion of the International Search Authority in the international application No. PCT/CN2019/096232, dated Sep. 26, 2019, 8 pages.

\* cited by examiner

OBJECT THREE-DIMENSIONAL DETECTION METHOD AND APPARATUS, INTELLIGENT DRIVING CONTROL METHOD AND APPARATUS, MEDIUM AND DEVICE

CROSS-REFERENCE TO RELATED APPLICATIONS

This application claims priority to Chinese Patent Application No. CN201810891535.0, filed with the Chinese Patent Office on Aug. 7, 2018 and entitled "OBJECT THREE-DIMENSIONAL DETECTION METHOD AND APPARATUS, INTELLIGENT DRIVING CONTROL METHOD AND APPARATUS, MEDIUM AND DEVICE", which is hereby incorporated by reference in its entirety.

TECHNICAL FIELD

The disclosure relates to the field of computer vision technology, and particularly to, a three-dimensional (3D) object detection method, a 3D object detection device, a method for controlling smart driving, a device for controlling smart driving, an electronic apparatus, a computer-readable storage medium and computer programs.

BACKGROUND 3D detection of an object is usually used for predicting a 3D spatial parameter of a body, such as its spatial position, its movement direction and its 3D size. For example, in the automatic driving technology, the 3D detection of other vehicles on a road needs to be performed to obtain 3D rectangular solids and travel directions of the vehicles, positional relationships between the vehicles and a shooting device and the like. Obtaining an accurate 3D detection result of the object facilitates improvement of safety in the automatic driving.

SUMMARY

Technical solutions of 3D object detection and smart driving control are provided in the embodiments of the disclosure.

An aspect according to the embodiments of the disclosure provides a 3D object detection method, the method including: obtaining 2D coordinates of at least one key point of a target object in an image to be processed; constructing a pseudo 3D detection body of the target object according to the 2D coordinates of the at least one key point; obtaining depth information of the key points; and determining a 3D detection body of the target object according to the depth information of the key points and the pseudo 3D detection body.

Another aspect according to the embodiments of the disclosure provides a method for controlling smart driving, the method including: determining a 3D detection body of a target object using any method in the embodiments of the disclosure by taking, as an image to be processed, a video frame included in a video acquired by a shooting device provided on a vehicle; generating a control instruction for the vehicle according to information of the 3D detection body; and transmitting the control instruction to the vehicle.

Yet another aspect according to the embodiments of the disclosure provides a 3D object detection device, the device including: a 2D coordinates acquisition module, configured to obtain 2D coordinates of at least one key point of a target object in an image to be processed; a 3D detection body construction module, configured to construct a pseudo 3D detection body of the target object according to the 2D coordinates of the at least one key point; a depth information acquisition module, configured to obtain depth information of the key points; and a 3D detection body determination module, configured to determine a 3D detection body of the target object according to the depth information of the key points and the pseudo 3D detection body.

Yet another aspect according to the embodiments of the disclosure provides a device for controlling smart driving, the device including: the 3D object detection device mentioned in any of the above embodiments of the disclosure, configured to determine a 3D detection body of a target object by taking, as an image to be processed, a video frame included in a video acquired by a shooting device provided on a vehicle; an instruction generation module, configured to generate a control instruction for the vehicle according to information of the 3D detection body; and an instruction transmission module, configured to transmit the control instruction to the vehicle.

Yet another aspect according to the embodiments of the disclosure provides an electronic device, the electronic device including: a memory configured to store a computer program; and a processor configured to execute the computer program stored in the memory, herein when the computer program is executed, the processor is caused to implement the method in any of the above embodiments of the disclosure.

Yet another aspect according to the embodiments of the disclosure provides a computer-readable storage medium having stored thereon a computer program that, when executed by a processor, causes the method in any of the above embodiments of the disclosure to be implemented.

Yet another aspect according to the embodiments of the disclosure provides a computer program including computer instructions. When running in a processor of a device, the computer instructions implement the method in any of the above embodiments of the disclosure.

Based on the 3D object detection method, the 3D object detection device, the method for controlling the smart driving, the device for controlling the smart driving, the computer-readable storage medium and the computer program, a pseudo 3D detection body of a target object is constructed in a 2D plane using 2D coordinates of at least one key point of the target object. Since an accuracy in detecting the key points of target object can be guaranteed, in the embodiments of the disclosure, depth information of the key points and the pseudo 3D detection body can make a size of a 3D detection body of the target object approximate to the target object's actual size. Therefore, it is conducive to improve the accuracy of the 3D object detection with relatively computing resources being consumed, thereby facilitating the improvement of safety in the automatic driving with a low implementation cost.

The technical solutions of the present disclosure are described in detail below, with reference to the accompanying drawings and embodiments.

BRIEF DESCRIPTION OF THE DRAWINGS

The accompanying drawings constituting a part of the specification describe the embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION

Figure 1:
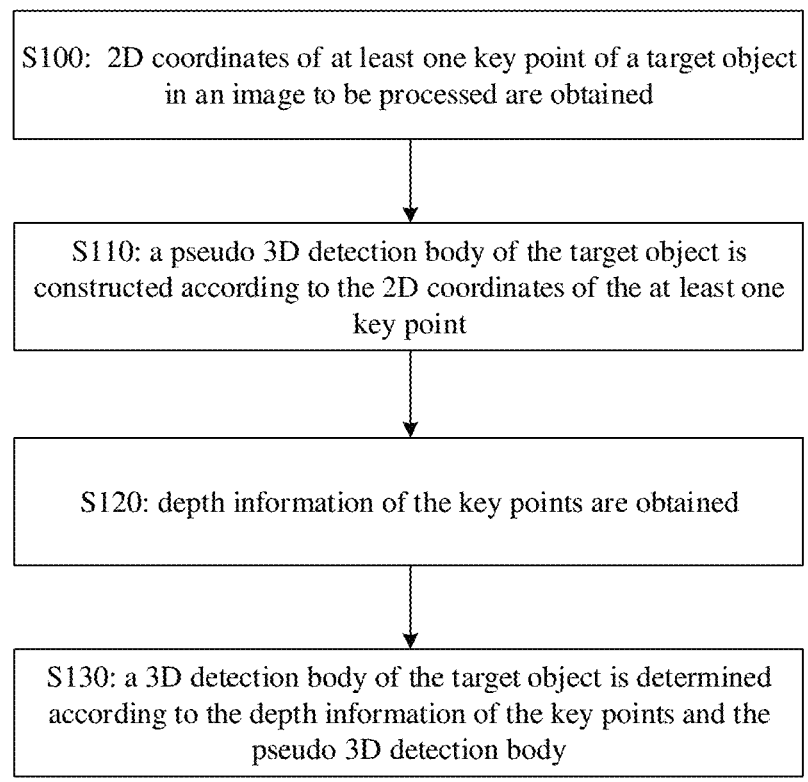
FIG. 1 is a flowchart of a 3D object detection method according to an embodiment of the disclosure.

Various exemplary embodiments of the present disclosure are now described in detail with reference to the accompanying drawings. It should be noted that, unless otherwise stated specifically, relative arrangement of the components and operations, the numerical expressions, and the values set forth in the embodiments are not intended to limit the scope of the present disclosure.

It should also be understood that in the embodiments of the disclosure, "a plurality of" may mean "two or more" and "at least one" may mean "one, two or more".

Those skilled in the art may understand terms including "first" and "second" in the embodiments of the disclosure are merely used to make different operations, different devices, different modules or the like distinguished from each other and the terms neither have any specific technical meaning nor represent that they are in a necessary logical order.

It should also be understood that the number of parts, data or structures mentioned in the embodiments of disclosure is equal to or greater than one unless definite limitation is imposed, or opposite enlightenment is given in the context.

It should also be understood that description of each embodiment puts emphasis on differences among the embodiments while same things or similarities shared by the embodiments can be referred to and will not be elaborated for the sake of brevity.

Furthermore, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to people of ordinary skills in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

In addition, the term "and/or" in the disclosure is only a kind of association relationship describing related objects, which means that there can be three kinds of relationships, for example, A and/or B can mean: A exists alone, both A and B exist, and B exists alone. In addition, the character "I" in the disclosure generally indicates that the related objects before and after the character have an "or" relationship.

The embodiments of the present disclosure may be applied to an electronic apparatus such as a terminal device, a computer system and a server, which may operate with numerous other general-purpose or special-purpose computing system environments or configurations. Examples of well-known terminal devices, computing systems, environments, and/or configurations suitable for use together with the electronic apparatus such as the terminal device, the computer system and the server include but are not limited to: personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The electronic apparatus such as the terminal device, the computer system and the server may be described in the general context of computer system executable instructions (for example, program modules) executed by the computer system. Generally, the program modules may include routines, programs, target programs, components, logics, data structures, and the like, to perform specific tasks or implement specific abstract data types. The computer system and the server may be practiced in the distributed cloud computing environments in which tasks are performed by remote processing devices that are linked through a communications network. In the distributed computing environments, the program modules may be located in local or remote computing system storage media including storage devices.

FIG. 1 is a flowchart illustrating a 3D object detection method according to an embodiment of the disclosure. As illustrated in FIG. 1, the method according to the embodiment includes operations S100, S110 and S120.

In operation S100, 2D coordinates of at least one key point of a target object in an image to be processed are obtained.

In an optional example, the image to be processed according to the embodiment of the disclosure may be an image such as a stationary picture or a stationary photo or a video frame in a dynamic-looking video. For example, the image to be processed may be a video frame of a video captured by a shooting device arranged on a moving body, or a video frame of a video captured by a shooting device arranged at a fixed position. The above moving body may be a vehicle, a robot, a mechanical arm or the like. The above fixed position may be a tabletop, a wall or the like. Forms that the moving body and the fixed position take are not limited in the embodiments of the disclosure.

In one optional example, the image to be processed according to the embodiment of the disclosure may be an image captured by a common high-definition shooting device. Radar range devices, depth camera devices or the like, which introduce a phenomenon such as a high implementation cost, can be avoided in the present disclosure.

In one optional example, the target object according to the embodiment of the disclosure at least includes four faces: a front face, a rear face, a left face and a right face. For example, the target object in the embodiments of the disclosure may be a motor vehicle (especially an automobile such as an oil-fuelled automobile, an electric automobile, and an unmanned automobile), a non-motor vehicle (such as a bicycle and a man-powered tricycle), a pedestrian, an animal, a building, a plant, an obstacle, a dangerous article, a traffic sign, an article or the like. Since the target object may take multiple forms, the forms are not limited in the embodiments of the disclosure. In conclusion, the 3D object detection method in the embodiments of the disclosure can be widely used.

In one optional example, the key points according to the embodiment of the disclosure are ones with a semantic meaning. The key points are usually ones on an outer contour of the target object. When the target object is a vehicle, the key points with the semantic meaning in the embodiments of the disclosure may include: a key point in a front left corner of the vehicle (which is designated by 1 in the FIG. 2 and is called "lower front left" for short), a key point in a front left corner on a roof of the vehicle (which is designated by 2 in the FIG. 2 and is called "upper front left" for short), a key point in a rear left corner on the roof of the vehicle (which is designated by 3 in the FIG. 2 and is called "upper rear left" for short), a key point in a rear left corner of the vehicle (which is designated by 4 in the FIG. 2 and is called "lower rear left" for short), a key point at a bottom of a rear left wheel (which is designated by 5 in the FIG. 2 and is called "rear left wheel" for short), a key point at a bottom of a front left wheel (which is designated by 6 in the FIG. 2 and is called "front left wheel" for short), a key point in a front right corner of the vehicle (which is designated by 7 in the FIG. 2 and is called "lower front right" for short), a key point in a front right corner on the roof of the vehicle (which is designated by 8 in the FIG. 2 and is called "upper front right" for short), a key point in a rear right corner on the roof of the vehicle (which is bilaterally symmetrical with 3 in FIG. 2 and is called "upper rear right" for short), a key point in a rear right corner of the vehicle (which is bilaterally symmetrical with 4 in FIG. 2 and is called "lower rear right" for short), a key point at a bottom of a rear right wheel (which is bilaterally symmetrical with 5 in FIG. 2 and is called "rear right wheel" for short), a key point at a bottom of a front right wheel (which is bilaterally symmetrical with 6 in FIG. 2 and is called "front right wheel" for short). In other words, the semantics of the key points may represent positions of the key points in the vehicle. In addition, the vehicle in the embodiments of the disclosure may also include more key points. The number of the key points of the target object and the semantics that the key points show are not limited in the embodiments of the disclosure.

Figure 2:
FIG. 2 is a schematic diagram of key points in a target object in an image to be processed according to an embodiment of the disclosure.

In one optional example, any key point according to the embodiment of the disclosure usually corresponds to one or two or three faces of the pseudo 3D detection body (such as a 3D rectangular solid). Likewise, the key point in the embodiment of the disclosure usually corresponds to one or more faces of the 3D detection body. In other words, there is a correspondence relationship between the key points and the faces of the pseudo 3D detection body and there is also a correspondence relationship between the key points and the faces of the 3D detection body. As illustrated in FIG. 2, the "lower front left", the "upper front left", the "lower front right" and the "upper front right" correspond to a front face of the pseudo 3D detection body and a front face of the 3D detection body, that is to say, the four key points, i.e., the "lower front left", the "upper front left", the "lower front right" and the "upper front right", can be seen from a position in the front of the vehicle; the "lower front left", the "upper front left", the "lower rear left", the "upper rear left", the "front left wheel" and the "rear left wheel" correspond to a left face of the pseudo 3D detection body and a left face of the 3D detection body, that is to say, the six key points, i.e., the "lower front left", the "upper front left", the "lower rear left", the "upper rear left", the "front left wheel", and the "rear left wheel", can be seen from a position on the left of the vehicle; the "lower rear left", the "upper rear left", the "lower rear right", and the "upper rear right" correspond to a rear face of the pseudo 3D detection body and a rear face of the 3D detection body, that is to say, the four key points, i.e., the "lower rear left", the "upper rear left", the "lower rear right", and the "upper rear right", can be seen from a position behind the vehicle; the "lower front right", the "upper front right", the "lower rear right", the "upper rear right", the "front right wheel", and the "rear right wheel" correspond to a right face of the pseudo 3D detection body and a right face of the 3D detection body, that is to say, the six key points, i.e., the "lower front right", the "upper front right", the "lower rear right", the "upper rear right", the "front right wheel", the "rear right wheel", can be seen from a position on the right of the vehicle; the "lower front left", the "upper front left", the "lower front right", the "upper front right" the "lower rear left", the "upper rear left", the "lower rear right", the "upper rear right" correspond to a top face of the pseudo 3D detection body and a top face of the 3D detection body, that is to say, the eight key points, i.e., the "lower front left", the "upper front left", the "lower front right", the "upper front right" the "lower rear left", the "upper rear left", the "lower rear right", the "upper rear right", can be seen from a position above the vehicle; the "lower front left", the "lower front right", the "lower rear left", the "lower rear right", the "front left wheel", the "front right wheel", the "rear left wheel" and the "rear right wheel" correspond to a bottom face of the pseudo 3D detection body and a bottom face of 3D detection body, that is to say, the eight key points, i.e., the "lower front left", the "lower front right", the "lower rear left", the "lower rear right", the "front left wheel", the "front right wheel", the "rear left wheel" and the "rear right wheel", can be seen from a position behind the vehicle. In addition, it should be particularly noted that, the correspondence relationship between the key points and the top and bottom faces of the pseudo 3D detection body and of the 3D detection body may not be set in the present disclosure.

In an optional example, before the above operation S100 is performed, target object detection may be performed on the image to be processed to obtain a 2D target bounding box including the target object. Accordingly, in operation S100, the 2D coordinates of the at least one key point of the target object are obtained based on an image part of the image to be processed corresponding to the 2D target bounding box.

In an optional example, an existing neural network according to the embodiment of the disclosure may be adopted to obtain the 2D coordinates of the at least one key point of the target object in the image to be processed. For example, the image to be processed that includes the target object (such as a vehicle) is inputted into the neural network, then the neural network performs key point detection (such as detection of vehicle's key points) processing on the image to be processed, it is thus possible to obtain the 2D coordinates of each key point of the target object in the image to be processed according to information outputted by the neural network. For another example, firstly, target object detection processing is performed on the image to be processed to obtain a position of a 2D target bounding box including the target object, and then segmentation processing may be performed on the image to be processed according to the position of the 2D target bounding box to obtain an image block of the target object (i.e., an image block including the target object such as a vehicle image block that is an image block including a vehicle); and the image block of the target object is inputted into the neural network, and then the neural network performs key point detection (such as the detection of a vehicle's key points) processing on the image block of the target object, it is thus possible to obtain 2D coordinates of each key point of the target object (such as a vehicle) in the image block of the target object (such as the vehicle image block) according to information outputted by the neural network. Furthermore, the 2D coordinates of the each key point of the target object in the image block of the target object can be converted to the 2D coordinates of the each key point of the target object in the image to be processed. An implementation of obtaining the 2D coordinates of the at least one key point of the target object through the neural network is not limited in the embodiments of the disclosure. In addition, after the 2D target bounding box (a bounding box including the target object) is successfully obtained, other operations in the 3D object detection method continue to be performed in the embodiment of the disclosure; otherwise, these operations may not be performed in the embodiment of the disclosure, thus it is conducive to saving computing resources.

In one optional example, the neural network according to the embodiment of the disclosure may include but is not limited to: a convolutional layer, a rectified linear unit (Relu) layer, a pooling layer, a fully connected layer and the like. The neural network becomes deeper as a number of the layers included in the neural network increases. In the embodiment of the disclosure, the neural network may adopt a stack hourglass neural network frame structure, or may also adopt a neural network frame structure based on an active shape model (ASM), a neural network frame structure based on an active appearance model (AAM) or a neural network frame structure based on a cascaded shape regression algorithm. A structure of the neural network is not limited in the embodiments of the disclosure.

In an optional example, a processor may execute corresponding instructions stored in a memory to perform the operation S100. Alternatively, the operation S100 may also be performed by a 2D coordinates acquisition module 500 run by the processor.

In operation S110, a pseudo 3D detection body of the target object is constructed according to the 2D coordinates of the at least one key point.

In an optional example, the pseudo 3D detection body of the target object according to the embodiment of the disclosure is usually: a rectangular solid that can include the target object in a 2D plane. In other words, a rectangular solid may be formed by drawing on the 2D plane. The rectangular solid is not a real one in a 3D space but looks like a rectangular solid from a perspective of a plane. As a result, the rectangular solid is called a pseudo 3D detection body in the embodiment of the disclosure. Although the pseudo 3D detection body is not a real rectangular solid in the 3D space, its length, width and height can still reflect the target object's length, width and height. Usually, the pseudo 3D detection body's length, width and height may be regarded as the length, the width and the height of the target object in the pseudo 3D detection body. In other words, the pseudo 3D detection body may be regarded as a circumscribed rectangular solid of the target object on the 2D plane. In addition, the pseudo 3D detection body in the embodiment of the disclosure includes a pseudo 3D cube.

In an optional example, firstly, all the key points of the currently obtained target object are screened to obtain one or more key points that meet a prediction accuracy requirement (such as the key points with a credibility greater than a preset credibility threshold), and then the pseudo 3D detection body of the target object is constructed on the 2D plane according to the 2D coordinates of the selected key points that meet the prediction accuracy requirement. The key points with low prediction accuracies are avoided to be used in the construction of the pseudo 3D detection body of the target object in the embodiment of disclosure, thus the technical scheme according to the embodiment is conducive to making the pseudo 3D rectangular solid constructed more accurately.

In an optional example, firstly at least one possible plane of the target object is constructed according to first predetermined belonging relationships between the key points and planes included by the target object as well as the 2D coordinates of the at least one key point, and then the pseudo 3D detection body of the target object is constructed according to the constructed possible planes. In the embodiment of the disclosure, the possible planes may be an optimal plane, or an optimal plane and a suboptimal plane.

When the possible planes in the embodiment of the disclosure include an optimal plane, in an optional example, an optimal plane is determined from among the at least one constructed possible plane according to a predetermined rule for plane quality determination and then the pseudo 3D detection body of the target object is constructed according to the optimal plane.

When the possible planes in the embodiment of the disclosure are an optimal plane and a suboptimal plane, in an optional example, an optimal plane and a suboptimal plane are determined from among the at least one constructed possible plane according to the predetermined rule for plane quality determination and then the pseudo 3D detection body of the target object are constructed according to the optimal plane and the suboptimal plane.

In an optional example, firstly the optimal plane of the target object in the image to be processed is determined and constructed on the 2D plane, and then a normal vector of the optimal plane is determined to form the pseudo 3D detection body based on extensions of at least one key point of the optimal plane along a direction of the normal vector; by doing so, the pseudo 3D detection body is constructed quickly and accurately.

In an optional example, the target object may include multiple key points. Accordingly, a manner of determining the optimal plane of the target object in the image to be processed may be: firstly, a quality of each of planes corresponding to the respective key points meeting the prediction accuracy requirement is determined, that is to say, the quality of each plane is rated according to the key points meeting the prediction accuracy requirement; then a plane whose quality rates highest is determined as the optimal plane of the target object. Accordingly, in the embodiment, the pseudo 3D detection body of the target object may be constructed according to the 2D coordinates of the selected key points.

In an optional example, a manner of rating the qualities of the planes may be: a number of the key points that meet the prediction accuracy requirement and correspond to each plane is calculated and determined as a rated quality score of the plane. As a result, the greater the number of the key points that meet the prediction accuracy requirement and correspond to one plane is, the higher the rated quality score of the plane is. For example, in FIG. 2, if all of the key point 1, the key point 2, the key point 3, the key point 4, the key point 5, the key point 6, the key point 7 and the key point 8 are assumed to meet the prediction accuracy requirement; as the key point 1, the key point 2, the key point 3, the key point 4, the key point 5 and the key point 6 correspond to the left face of the vehicle, whereas the key point 1, the key point 2, the key point 7 and the key point 8 correspond to the front face of the vehicle. Thus, the left face of the vehicle has a highest rated quality score, and is thus the optimal plane.

In an optional example, the manner of rating the qualities of the planes may also be: a sum of prediction accuracies of the key points that meet the prediction accuracy requirement and correspond to each plane is calculated so that at least one plane corresponds to a prediction accuracy score. In the embodiment of the disclosure, the prediction accuracy score of a plane may be determined as the rated quality score of the plane. As a result, the higher a prediction accuracy score corresponding to a plane is, the higher the rated quality score of the plane is.

In an optional example, the manner of rating the qualities of the planes may also be: the number of the key points that meet the requirement of the prediction accuracy and correspond to each plane as well as a sum of the prediction accuracies of the key points are calculated, thus each plane corresponds to a number of the key points and a prediction accuracy score; in the embodiment of the disclosure, the prediction accuracy score corresponding to each plane divided by the number of the key points corresponding to the plane is calculated. That is to say, an average prediction accuracy score of each plane is calculated and determined as the rated quality score of the plane. As a result, the greater the average prediction accuracy score corresponding to a plane is, the higher the rated quality score of the plane is.

Three manners of rating the qualities of the planes are listed above. Other manners may be adopted to determine the qualities of the planes in the embodiment of the disclosure. How the qualities of the planes are rated is not limited in the embodiments of the disclosure.

In an optional example, the optimal plane according to the embodiment of the disclosure may be constructed on the 2D plane in multiple manners. For example, a perpendicular line (i.e., a vertical line passing through a key point) is made on the 2D plane using the key point on the optimal plane. One edge on the optimal plane is located on the perpendicular line. An intersection point between the perpendicular line and one edge on one of other planes is a vertex of the optimal plane. For another example, a line is made on the 2D plane by connecting two key points on the optimal plane. The connecting line or the connecting line together with its extension line can be one edge on the optimal plane. In other words, the two key points can be two vertices on the optimal plane, or an intersection point between the extension line of the line connecting the two key points and one edge on one of the other planes is a vertex of the optimal plane. For another example, a parallel line, which is a line parallel to another edge on the optimal plane, is made using a key point on the optimal plane. That is to say, the line passing through the key point on the optimal plane is made to be parallel to another edge on the optimal plane. One edge on the optimal plane is located on the parallel line. An intersection point between the parallel line and the above perpendicular line or an intersection point between the parallel line and one edge on one of other planes is a vertex of the optimal plane. Implementation manners of constructing the optimal plane on the 2D space are not limited in the embodiments of the disclosure.

In an optional example, the normal vector of the optimal plane according to the embodiment of the disclosure may be determined in multiple manners. In a first example, firstly the suboptimal plane of the pseudo 3D detection body is determined and then a line perpendicular to the optimal plane is made using a key point on the suboptimal plane so that the perpendicular line may be determined as the normal vector of the optimal plane. In a second example, the key points corresponding to the optimal plane are removed from all the key points meeting the prediction accuracy requirement; a key point with a greatest prediction accuracy is selected from among the remaining key points; a perpendicular line is made from the key point to the optimal plane and is determined as the normal vector of the optimal plane. In a third example, if there are two key points which are included in a plane adjacent to the optimal plane and a line connecting the two key points is located on an edge which is on the adjacent plane and perpendicular to the optimal plane, a difference between coordinates of the two key points on the 2D plane can be determined as the normal vector of the optimal plane. For example, in FIG. 2, if it is assumed that a left face of the vehicle is the optimal plane, the front face of the vehicle is the suboptimal plane, the coordinates of the key point 7 on the 2D plane are $(u_7, v_7)$, and the coordinates of the key point 1 on the 2D plane are $(u_1, v_1)$, $(u_7-u_1, v_7-v_1)$ may be determined as the normal vector of the optimal plane in the embodiment of the disclosure. Only three examples are listed above but the normal vector of the optimal plane may be obtained in other manners in the embodiment of the disclosure. The implementation manners of obtaining the normal vector of the optimal plane are not limited in the embodiments of the disclosure.

In an optional example, a process of determining the suboptimal plane according to the embodiment of the disclosure may be: firstly planes adjacent to the optimal plane are determined and then in terms of the key points except for the ones included by the optimal plane, a number of key points included in each of the planes adjacent to the optimal plane is calculated. In the embodiment of the disclosure, a plane including most key points may be determined as the suboptimal plane, so that an improper selection of the suboptimal plane may be avoided. For example, in FIG. 2, since an error occurs in the detection of the key points, not only the key point 1, the key point 2, the key point 3, the key point 4, the key point 5, the key point 6, the key point 7 and the key point 8 are obtained, but also a key point 10 is obtained. If it is assumed that the key point 1, the key point 2, the key point 3, the key point 4, the key point 5, the key point 6, the key point 7, the key point 8 and the key point 10 all meet the prediction accuracy requirement and the key point 10 has a greater prediction accuracy, it is apparent that the key point 10 is mistakenly detected during key point detection. In the embodiment of the disclosure, the suboptimal plane is determined in the above manner, so that making a perpendicular line from the key point 10 to the optimal plane to obtain the normal vector of the optimal plane may be avoided.

Figure 3:
FIG. 3 is a schematic diagram of a pseudo 3D detection body according to an embodiment of the disclosure.

In an optional example, after the optimal plane and its normal vector are determined, the vertices on the optimal plane can be extended along the direction of the normal vector of the optimal plane so that the extension may intersect with edges on other planes and finally cause the pseudo 3D detection body to be formed. For example, in FIG. 2, a first perpendicular line passing through the key point 1 and a second perpendicular line passing through the key point 4 are formed; then a first line, which passes through the key point 6 and the key point 5 simultaneously and intersects with the first perpendicular line and the second perpendicular line respectively, is formed; and finally a second line, which passes through the key point 2 or the key point 3 to be parallel to the first line and intersect with the two perpendicular lines respectively, is formed. As a result, four lines and four vertices of the optimal plane are formed; and the normal vector of the optimal plane is ($u_7$-$u_1$, $v_7$-$v_1$). The normal vector is also a bottom edge of the suboptimal plane. In the embodiment of the disclosure, a third perpendicular line passing through the key point 7 can be formed and a third line, which passes through the key point 7 and is parallel to the first line or the second line, is made. A top edge of the suboptimal plane is formed by extending a vertex in an upper left corner of the optimal plane along the direction of the normal vector to intersect with the third perpendicular line. A line, which connects the key point 8 and an intersection point between the extension of the above vertex and the third perpendicular line, intersects with a line formed by extension of a vertex in an upper right corner of the optimal plane along the direction of normal vector, at a point which a fourth perpendicular line is made to pass through. The fourth perpendicular line passing through the point will intersect with a line formed by extension of a vertex in a lower right corner of the optimal plane along the direction of the normal vector. Therefore, the pseudo 3D detection body is formed on the 2D space. In the embodiment of the disclosure, an example of the pseudo 3D detection body formed for the target object in the image to be processed is illustrated in FIG. 3. In the embodiment of the disclosure, after the optimal plane and its normal vector are determined, the pseudo 3D detection body may be formed in multiple manners. Implementation processes of forming the pseudo 3D detection body are not limited in the embodiments of the disclosure.

In an optional example, a processor may call corresponding instructions stored in a memory to perform the operation S110 that may also be performed by a 3D detection body construction module 510 run by the processor.

In operation S120, depth information of the key points is obtained.

In an optional example, firstly, a depth diagram of the image to be processed is obtained using a manner such as a monocular manner and a binocular manner; and then depth values of the key points are read from the depth diagram using the 2D coordinates of the at least one key point. In the embodiment of the disclosure, the depth values of the key points can also be directly obtained using a matrix H, that is to say, the depth values of key points (a unit of the depth values may be "meter") are obtained from a product of the 2D coordinates of the at least one key point and the matrix H. Furthermore, when the shooting device is a depth-based shooting device, the depth values of the key points can be directly obtained. An implementation process of obtaining the depth values of the key points is not limited in the embodiments of the present disclosure.

In an optional example, the processor may call corresponding instructions stored in the memory to perform the operation S120 that may also be performed by a depth information acquisition module 520 run by the processor.

In operation S130, a 3D detection body of the target object is determined according to the depth information of the key points and the pseudo 3D detection body.

In an optional example, the processor may call corresponding instructions stored in the memory to perform the operation S130 that may also be performed by a 3D detection body determination module 530 run by the processor.

In an optional example, firstly an initial 3D detection body (such as an initial 3D rectangular solid) is constructed in the 3D space according to the 2D coordinates and the depth information of the key points, then at least the pseudo 3D detection body is determined as a constraint condition of the 3D detection body and correction processing is performed on the initial 3D detection body so that the 3D detection body (such as a 3D rectangular solid) of the target object is obtained.

In an optional example, the 2D coordinates of the at least one key point are firstly converted into 3D coordinates in the 3D space according to the depth information of the key points and then the initial 3D detection body of the target object is constructed according to the 3D coordinates of the at least one key point that are obtained as a result of the conversion. In the embodiment of the disclosure, the 2D coordinates of the at least one key point may be selectively converted into the 3D coordinates in the 3D space. For example, only the 2D coordinates of the at least one key point meeting the prediction accuracy requirement are converted into the 3D coordinates in 3D space. Certainly, in the embodiment of the disclosure, the 2D coordinates of all key points may also be converted into the 3D coordinates in the 3D space but only the 3D coordinates of the at least one key point meeting the prediction accuracy requirement are used in the construction of the initial 3D detection body of the target object. The 3D space in the embodiment of the disclosure is usually one in a real world such as a 3D space based on a 3D coordinate system of a shooting device.

In an optional example, the 2D coordinates of the at least one key point may be converted to the 3D coordinates in the 3D space in multiple manners.

For example, the above-obtained depth value of each key point is converted into a distance in the 3D space that may be regarded as a distance between the key point and the shooting device; then the 3D coordinates of each key point are calculated using a formula (1) below.

$$P \times [X,Y,Z]^T = w \times [u,v,1]^T \qquad \text{formula (1).}$$

In the above formula (1), P represent a parameter of the shooting device; X, Y and Z represent the 3D coordinates of the key point, which are also 3D coordinates of the key point in the 3D space of the real world; z can be substituted in the above-obtained depth value of the key point; u and v represent the 2D coordinates of the key point, which are the 2D coordinates of the key point in a coordinate system in the image to be processed; and w represents a scaling factor.

If P is shown as a 3×3 matrix below:

$$\begin{pmatrix} a_{11} & a_{12} & a_{13} \\ a_{21} & a_{22} & a_{23} \\ a_{31} & a_{32} & a_{33} \end{pmatrix},$$

the above formula (1) can be expressed in a form of a formula (2) below:

$$\begin{cases} a_{11} \times X + a_{12} \times Y + a_{13} \times Z = w \times u \\ a_{21} \times X + a_{22} \times Y + a_{23} \times Z = w \times v \\ a_{31} \times X + a_{32} \times Y + a_{33} \times Z = w \end{cases} \qquad \text{formula (2)}$$

After variables X, Y and w are solved by substituting the 2D coordinates of multiple key points into the above formula (2), the 3D coordinates (X, Y, Z) of the key point are obtained.

In an optional example, firstly, the optimal plane of the target object in the 3D space may be determined and constructed on the 2D plane, then the normal vector of the optimal plane is determined and finally the initial 3D detection body (such as a 3D rectangular solid) is formed based on extensions of the key points of the optimal plane along a direction of the normal vector.

In an optional example, a manner of determining the optimal plane of the target object in the 3D space according to the embodiment of the disclosure may be: firstly, a quality of each of planes corresponding to the respective key points meeting the prediction accuracy requirement is determined, that is to say, the quality of each plane is rated based on the key points meeting the prediction accuracy requirement; then a plane whose quality rates highest is determined as the optimal plane of the target object. The manners of rating the qualities of the planes may include the ones listed in the above operation S110, which will not be repeated herein.

In an optional example, the optimal plane may be constructed in the 3D plane in multiple manners according to the embodiment of the disclosure. For example, a perpendicular line (i.e., a vertical line (in a direction y) passing through a key point) is made in the 3D plane using the key point on the optimal plane. One edge on the optimal plane is located on the perpendicular line. An intersection point between the perpendicular line and one edge on one of other planes is a vertex of the optimal plane. For another example, a line is made in the 3D space by connecting two key points on the optimal plane. The connecting line or the connecting line together with its extension line can be one edge on the optimal plane. In other words, the two key points can be two vertices on the optimal plane, or an intersection point between the extension line of the line connecting the two key points and one edge on one of the other planes is a vertex of the optimal plane. For another example, a parallel line, which is a line parallel to another edge on the optimal plane, is made using a key point on the optimal plane. That is to say, the line passing through the key point on the optimal plane is made to be parallel to another edge on the optimal plane. One edge on the optimal plane is located on the parallel line. An intersection point between the parallel line and the above perpendicular line or an intersection point between the parallel line and one edge on one of other planes is a vertex of the optimal plane. Implementation manners of constructing the optimal plane in the 3D space are not limited in the embodiments of the disclosure.

In an optional example the normal vector of the optimal plane may be determined in multiple manners according to the embodiment of the disclosure. In a first example, firstly a suboptimal plane of the 3D detection body is determined and then a line perpendicular to the optimal plane is made using a key point on the suboptimal plane so that the perpendicular line may be determined as the normal vector of the optimal plane. In a second example, the key points corresponding to the optimal plane are removed from all the key points meeting the prediction accuracy requirement; a key point with a greatest prediction accuracy is selected from among the remaining key points; a perpendicular line is made from the key point to the optimal plane and is determined as the normal vector of the optimal plane. In a third example, if there are two key points which are included in a plane adjacent to the optimal plane and a line connecting the two key points is located on an edge which is on the adjacent plane and perpendicular to the optimal plane, a difference between coordinates of the two key points in the 3D space can be determined as the normal vector of the optimal plane. For example, in FIG. 2, if it is assumed that a left face of the vehicle is the optimal plane, the front face of the vehicle is the suboptimal plane, the coordinates of the key point 7 in the 3D space are $(X_7, Y_7, Z_7)$, and the coordinates of the key point 1 in the 3D plane is $(X_1, Y_1, Z_1)$, $(X_7-X_1, X_7-X_1, Z_7-Z_1)$ may be determined as the normal vector of the optimal plane in the embodiment of the disclosure. Only three examples are listed above but the normal vector of the optimal plane may be obtained in other manners in the embodiment of the disclosure. The implementation manner of obtaining the normal vector of the optimal plane is not limited in the embodiments of the disclosure.

In an optional example, after the optimal plane and its normal vector are determined, the vertices on the optimal plane can be extended along the direction of the normal vector of the optimal plane so that the extension may intersect with edges on other planes and finally cause the initial 3D detection body to be formed. For example, in FIG. 2, a first perpendicular line passing through the key point 1 and a second perpendicular line passing through the key point 4 are formed; then a first line, which passes through the key point 6 and the key point 5 simultaneously and intersects with the first perpendicular line and the second perpendicular line respectively, is formed; and finally a second line, which passes through the key point 2 or the key point 3 to be parallel to the first line and intersect with the two perpendicular lines respectively, is formed. As a result, four lines and four vertices of the optimal plane are formed; and the normal vector of the optimal plane is $(X_7-X_1, Y_7-Y_1, Z_7-Z_1)$. The normal vector is also a bottom edge of the suboptimal plane. In the embodiment of the disclosure, a third perpendicular line passing through the key point 7 can be formed and a third line, which passes through the key point 7 and is parallel to the first line or the second line, is made. A top edge of the suboptimal plane is formed by extending a vertex in an upper left corner of the optimal plane along the direction of the normal vector to intersect with the third perpendicular line. A line, which connects the key point 8 and an intersection point between the extension of the above vertex and the third perpendicular line, intersects with a line formed by extension of a vertex in an upper right corner of the optimal plane along the direction of normal vector, at a point which a fourth perpendicular line is made to pass through. The fourth perpendicular line passing through the point will intersect with a line formed by extension of a vertex in a lower right corner of the optimal plane along the direction of the normal vector. Therefore, the 3D detection body is formed on the 2D space. In the embodiment of the disclosure, after the optimal plane and its normal vector are determined, the initial 3D detection body may be formed in multiple manners. Implementation processes of forming the initial 3D detection body are not limited in the embodiments of the disclosure.

As a basic computer vision task such as road segmentation and semantic segmentation is not needed in the above manner, the initial 3D detection body can be quickly constructed for the target object, which involves lower consumption of the computing resources and a lower implementation cost. In addition, in embodiment of the disclosure, since the initial 3D detection body is constructed based on the key points of the target object and a process of constructing the initial 3D detection is not relevant to factors such as whether the target object is on the ground, a phenomenon, such as inability to implement 3D object detection due to that the target object is in application scenarios other than the ground, can be avoided efficiently in the embodiment of the disclosure, thus it is conducive to broadening the application scope of the 3D object detection.

In an optional example, the operation that the initial 3D detection body is corrected according to the pseudo 3D detection body to form the 3D detection body of the target object may include: the initial 3D detection body in the 3D space is adjusted according to the pseudo 3D detection body in the 2D plane to enlarge an overlap area between a region of the adjusted 3D detection body projected on the 2D plane and the pseudo 3D detection body.

In an optional example, each vertex of the initial 3D detection body can be projected on the 2D plane so that a graph of the initial 3D detection body on the 2D plane is obtained. In the embodiment of the disclosure, an overlap area between the graphic region projected on the 2D plane and the pseudo 3D detection body in the 2D plane may be changed by adjusting the initial 3D detection body in the 3D space. For example, the overlap area can be made as large as possible. For another example, an intersection over union between the graphic region projected on the 2D plane and the pseudo 3D detection body in the 2D plane is made as large as possible.

In an optional example, a manner of changing the overlap area according to the embodiment of the disclosure includes: a position of the 3D detection body in the 3D space is adjusted to make the overlap area between the pseudo 3D detection body and the graphic region of the initial 3D detection body projected on the 2D plane maximal. For example, the graphic region of the initial 3D detection body projected on the 2D plane is made to completely cover the pseudo 3D detection body; for another example, the pseudo 3D detection body is made to completely cover the graphic region of the initial 3D detection body projected on the 2D plane.

In an optional example, a manner of changing the overlap area according to the embodiment of the disclosure can also include: a size of the initial 3D detection body in the 3D space is adjusted so that the graphic region of the initial 3D detection body projected on the 2D plane is as consistent with a graphic region of the pseudo 3D detection body as possible. For example, when the initial 3D detection body is projected on the 2D space, if a ratio of a length value/a width value/a height value of the resulting projection graph to the length value/the width value/the height value of the pseudo 3D detection body does not meet a preset ratio (for example, the preset ratio is between 0.9 and 1.1), the length value/the width value/the height value of the initial 3D detection in the 3D space can be adjusted in the embodiment of the disclosure so that the adjusted ratio of the length value/the width value/the height value of the projection graph of the 3D detection body projected on the 2D space to the length value/the width value/the height value of pseudo 3D detection body meets the preset ratio, or the projection graph and the pseudo 3D detection body have the same length value/width value/height value.

Since the key points of the target object in the image to be processed can be detected with a relatively high accuracy and detection is relatively fast, the pseudo 3D detection body can be constructed with a higher accuracy and quickly on the 2D plane using the key points of the target object. In the embodiment of the disclosure, the initial 3D detection body in the 3D space is corrected using the pseudo 3D detection body, thus it is conducive to improving accuracy in constructing the 3D detection body in the 3D space for the target object.

In an optional example, a length-to-width-to-height ratio preset for the target object can also be determined as a constraint condition of the initial 3D detection body, so that the initial 3D detection body can be corrected in the 3D space according to the constraint condition. For example, in the case that the target object is a vehicle, a length-to-width-to-height ratio of the vehicle can be preset as 2:1:1 in the embodiment of the disclosure so that when the length-to-width-to-height ratio of the initial 3D detection body is not in a certain range around 2:1:1, the length, the width and height of the initial 3D detection body can be adjusted to keep the adjusted length-to-width-to-height ratio of the 3D detection body within the range.

In an optional example, a bounding box of the target object in the image to be processed can also be determined as a constraint condition of the initial 3D detection body, so that the initial 3D detection body can be corrected in the 3D space according to the constraint condition. For example, in the embodiment of the disclosure, in the case that the target object is a vehicle, a bounding box of the vehicle (which can also be called a circumscribed frame of the vehicle) can be determined as a constraint condition of the initial 3D detection body to adjust a whole position and/or the length, the width and the height of the initial 3D detection body, so that the projection graph of the 3D detection body projected on the 2D space can completely be included in the bounding box. Since the bounding box of the target object is usually accurate, using the bounding box as a constraint condition to correct the initial 3D detection body is conducive to improving the accuracy of the 3D object detection.

In an optional example, when the image to be processed is one of multiple images to be processed which are temporally correlated (such as a video frame in a video), smoothing processing can be performed on the adjusted 3D detection body. The smoothing processing can includes at least one of: smoothing processing on a length, a width and a height of the 3D detection body, smoothing processing on a motion direction of the 3D detection body, smoothing processing on a central point of a bird's eye view of the 3D detection body. In addition, in the embodiment of the disclosure, the smoothing processing may be also performed on eight vertices of the 3D detection body. In the embodiment of the disclosure, the smoothing processing performed on the 3D detection body is conducive to improving the accuracy of 3D object detection and avoiding a phenomenon that the target object shakes violently in two adjacent video frames, thereby facilitating the improvement of safety in the automatic driving.

In the embodiment of the disclosure, in a process of implementing the smooth processing, parameters, such as a length, a width, a height, a motion direction of a 3D detection body of a target object in a current image to be processed, and a central point of the bird's eye view of the target object in the current image to be processed, are predicted using multiple to-be-processed historic images (such as 5 or 6 or 7 historic video frames) that are prior to the current to-be-processed image and using a corresponding fitting function. In the embodiment of the disclosure, the smoothing processing may also be performed on the eight vertices of the 3D detection body of the target object. In the embodiment of the disclosure, the fitting function may be a quadratic function, a cubic exponential function, a logarithmic function or the like. An expression form of the fitting function adopted in a balancing processing procedure is not limited in the embodiments of the disclosure.

An example of a quadratic function as a fitting function, is shown in a formula (3) below:

$$x=f(t)=at^2+bt+c \qquad \text{formula (3)}.$$

In the above formula (3), x represents a value of the historic video frames used in optimal fitting. If the fitting is performed using 5 historic video frames, $x=(x_1, x_2, x_3, x_4, x_5)$, t represents times corresponding to the historic video frames. If the fitting is performed using 5 historic video frames, $t=(t_1, t_2, t_3, t_4, t_5)$, a, b and c represent coefficients of the quadratic functions.

In the embodiment of the disclosure, a, b and c in the formula (3) can be obtained firstly using the multiple historic video frames and then a prediction result pred of the current video frame is obtained using the formula (3).

In the embodiment of the disclosure, parameters such as a length, a width, a height, a motion direction, or a central point of a bird's eye view of a 3D detection body of a target object in the current video frame are adjusted accordingly using a weighting manner to implement the corresponding smoothing processing. For example, in the embodiment of the disclosure, the parameters such as the length, the width, the height, the motion direction, the central point of the bird's eye view of the 3D detection body of the target object in the current video frame can be adjusted accordingly using a formula (4) below.

$$x_6 = \alpha * pred + \beta * x_6' \qquad \text{formula (4).}$$

In formula (4), $\alpha$ represents a weight corresponding to the prediction result, pred represents the prediction result, $\beta$ represents a weight corresponding to a 3D object detection result of the current video frame, $x_6'$ represents the 3D object detection result of the current video frame, and $x_6$ represents a 3D object detection result of the current video frame subjected to the smoothing processing.

The value of the weight can be determined according to an actual requirement. For example, when there is a slight difference (for example, the difference is no greater than a preset value) between the prediction result and the 3D object detection result of the current video frame, it can be set that $\alpha=0.5$ and $\beta=0.5$; for another example, when there is a bigger difference (for example, the difference reaches the preset value) between the prediction result and the 3D object detection result of the current video frame, it can be set that $\alpha=0.8$ and $\beta=0.2$ or $\alpha=0.7$ and $\beta=0.3$. A specific value of the weight is not limited in the disclosure.

In an optional example, the 3D coordinates of the at least one key point of the target object may also be used to obtain 3D space parameters of the finally obtained 3D detection body. For example, the parameters include one or more of: a motion direction of the 3D detection body, a positional relationship between the 3D detection body and a shooting device capturing the image to be processed, or a size of the 3D detection body. The acquisition of the 3D space parameters may be used in control of the target object such as generation of a corresponding control instruction based on the obtained 3D space parameters.

A method for controlling smart driving is also provided in an embodiment of the disclosure and includes following operations: a 3D detection body of a target object is determined using the 3D object detection method in any of the above embodiments of the disclosure by taking, as an image to be processed, a video frame included in a video acquired by a shooting device provided on a vehicle; a control instruction for the vehicle is generated according to information of the 3D detection body; and the control instruction is transmitted to the vehicle.

Figure 4:
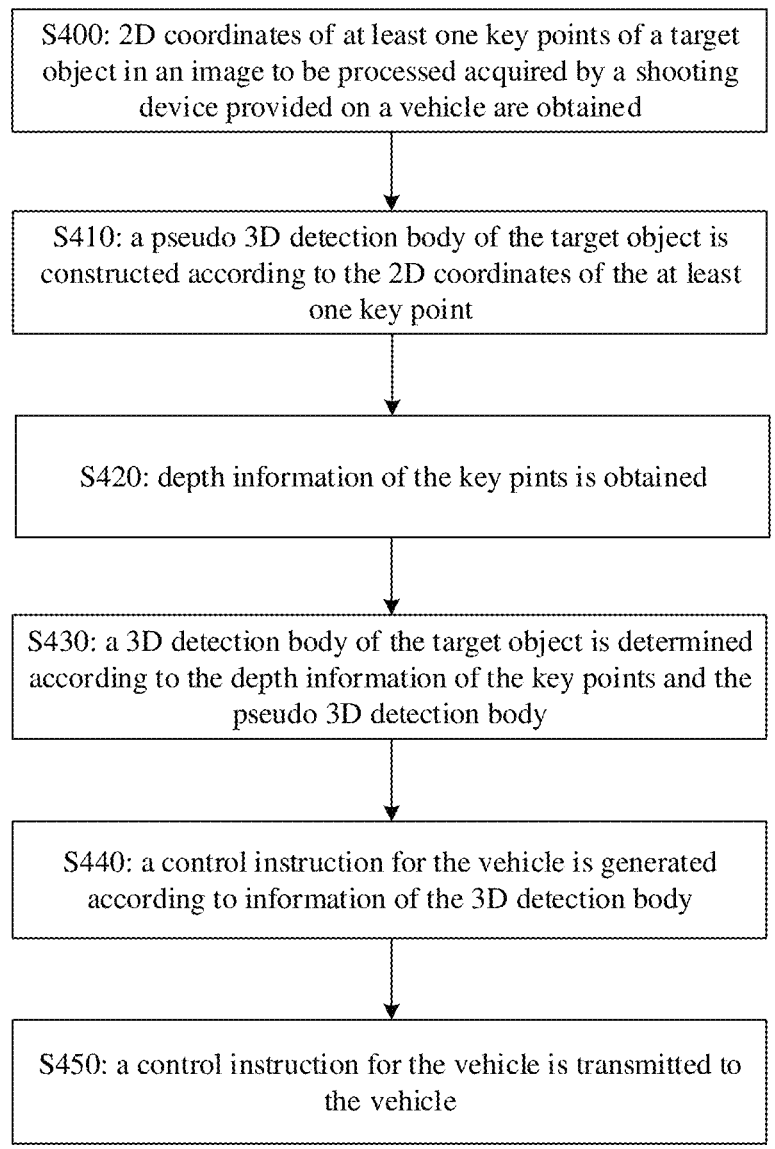
FIG. 4 is a flowchart of a method for controlling smart driving according to an embodiment of the disclosure.

FIG. 4 is a flowchart of a method for controlling smart driving according to an embodiment of the disclosure. The method for controlling smart driving in the embodiment of the disclosure can be applied to an automatic driving environment (such as automatic driving which is not assisted by humans) or an assisted driving environment. Environments where the method for controlling the smart driving is applied are not limited in the embodiments of the disclosure.

As illustrated in FIG. 4, the method for controlling the smart driving includes operations S400 to S450.

In operation S400, 2D coordinates of at least one key point of a target object in an image to be processed acquired by a shooting device provided on a vehicle are obtained. Description of operation S100 in FIG. 1 in the above method embodiments can be referred to for the implementation of operation, which will not be elaborated herein.

In an optional example, a processor may call corresponding instructions stored in a memory to perform the operation S400 that may also be performed by a 2D coordinates acquisition module 500 run by the processor.

In operation S410, a pseudo 3D detection body of the target object is constructed according to the 2D coordinates of the at least one key point. Description of operation S110 in FIG. 1 in the above method embodiments can be referred to for the implementation of operation, which will not be elaborated herein.

In an optional example, the processor may call the corresponding instructions stored in the memory to perform the operation S410 that may also be performed by a 3D detection body construction module 510 run by the processor.

In operation S420, depth information of the key points is obtained. Description of operation S120 in FIG. 1 in the above method embodiments can be referred to for the implementation of operation, which will not be elaborated herein.

In an optional example, the processor may call the corresponding instructions stored in the memory to perform the operation S420 that may also be performed by a depth information acquisition module 520 run by the processor.

In operation S430, a 3D detection body of the target object is determined according to the depth information of the key points and the pseudo 3D detection body. Description of operation S130 in FIG. 1 in the above method embodiments can be referred to for the implementation of operation, which will not be elaborated herein.

In an optional example, the processor may call the corresponding instructions stored in the memory to perform the operation S430 that may also be performed by a 3D detection body determination module 530 run by the processor.

In operation S440, a control instruction for the vehicle is generated according to information of the 3D detection body.

In an optional, the information of the 3D detection body includes one or more of: a motion direction of the 3D detection body, a positional relationship between the 3D detection body and the shooting device, or a size of the 3D detection body. The content included in the information of the 3D detection body includes is not limited in the embodiments of the disclosure.

In an optional example, the control instruction for the vehicle that is generated according to the information of the 3D detection body may include one or more of: a braking instruction, a decelerating driving instruction, an instruction for turning left, an instruction for turning right, an instruction for keep driving at a current speed, a honking instruction, or an accelerating driving instruction. The forms that the control instruction for the vehicle takes are not limited in the embodiments of the disclosure.

In an optional example, the processor may call the corresponding instructions stored in the memory to perform the operation S440 that may also be performed by an instruction generation module 610 run by the processor.

In operation S450, the control instruction for the vehicle is transmitted to the vehicle.

In an optional example, the processor may call the corresponding instructions stored in the memory to perform the operation S450 that may also be performed by an instruction transmission module 620 run by the processor.

It should be especially noted that besides a smart driving control field, the 3D object detection technique in the embodiment of the disclosure may also be suited to other fields such as object detection in industrial manufacturing, object detection in indoor regions including supermarkets and object detection in security defense. Scenarios to which the 3D object detection technique is suited are not limited in the embodiments of the disclosure.

Any of the 3D object detection methods and the methods for controlling the smart driving provided in the embodiment of the disclosure may be performed by any device that has a certain data processing capability. The device includes but is not limited to: a terminal device, a server and the like. Alternatively, any of the 3D object detection methods and the methods for controlling smart driving provided in the embodiment of the disclosure may be performed by a processor. For example, the processor performs any of the 3D object detection methods and the methods for controlling the smart driving described in the embodiments of the disclosure by calling corresponding instructions stored in a memory. Details will not be given below.

Those of ordinary skills in the art may understand: all or parts of the operations that implement the above method embodiments may be performed by hardware relevant to programs and instructions. The foregoing programs may be stored in a computer-readable storage medium. When the programs are executed, the operations including the above method embodiments are performed. The foregoing storage medium includes various media capable of storing program codes such as a Read-Only Memory (ROM), a Random Access Memory (RAM), a magnetic disk, an optical disk and the like.

Figure 5:
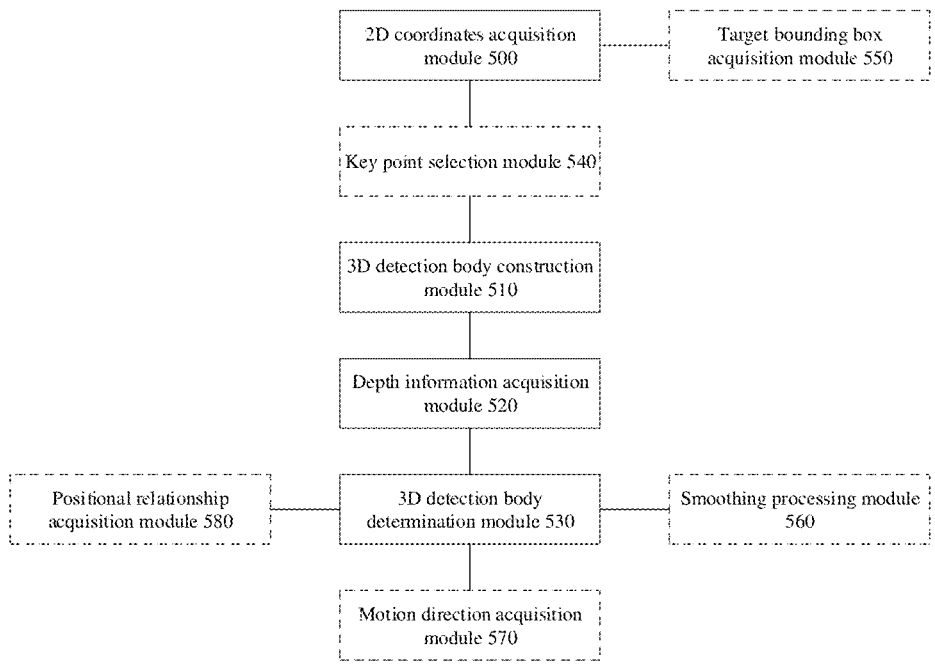
FIG. 5 is a schematic structural diagram of a 3D object detection device according to an embodiment of the disclosure.

FIG. 5 is a schematic structural diagram of a 3D object detection device according to an embodiment of the disclosure. As illustrated in FIG. 5, the device in the embodiment includes: a 2D coordinates acquisition module 500, a 3D detection body construction module 510, a depth information acquisition module 520 and a 3D detection body determination module 530. Optionally, the device further includes: a key point selection module 540, a target bounding box acquisition module 550, a smoothing processing module 560, a motion direction acquisition module 570 and a positional relationship acquisition module 580.

The 2D coordinates acquisition module 500 is configured to obtain 2D coordinates of at least one key point of a target object in an image to be processed. In the embodiment of the disclosure, the image to be processed may be a video frame of a video captured by a shooting device arranged on a moving body, or a video frame of a video captured by a shooting device arranged at a fixed position. The target object in the embodiment of the disclosure may include one or more of: a motor vehicle, a non-motor vehicle, a pedestrian, an animal, a building, a plant, an obstacle, a dangerous article, a traffic sign, or an article.

In an optional example, before the 2D coordinates acquisition module 500 performs its operation, the target bounding box acquisition module 550 may perform target object detection on the image to be processed to obtain a 2D target bounding box including the target object. Thus, the 2D coordinates acquisition module 500 may obtain the 2D coordinates of the at least one key point of the target object based on an image part of the image to be processed corresponding to the 2D target bounding box. In addition, in response to that the target bounding box acquisition module 550 does not obtain the 2D target bounding box including the target object successfully during the target object detection, the 3D object detection device in the embodiment of the disclosure may not perform 3D detection processing on the target object; for example, the 2D coordinates acquisition module 500 does not perform an operation of obtaining the 2D target bounding box.

The 3D detection body construction module 510 is configured to construct a pseudo 3D detection body of the target object according to the 2D coordinates of the at least one key point.

In an optional example, the 3D detection body construction module 510 may include a first sub-module and a second sub-module. The first sub-module is configured to construct at least one possible plane of the target object according to first predetermined belonging relationships between the key points and planes included by the target object as well as the 2D coordinates of the at least one key point. The second sub-module is configured to construct the pseudo 3D detection body of the target object according to the at least one possible plane.

In an optional example, the above second sub-module may include: a first unit and a second unit. The first unit is configured to determine an optimal plane from among the at least one constructed possible plane according to a predetermined rule for plane quality determination. The second unit is configured to construct the pseudo 3D detection body of the target object according to the optimal plane. In addition, the first unit may determine an optimal plane and a suboptimal plane from among the at least one constructed possible plane according to the predetermined rule for plane quality determination, and the second unit may construct the pseudo 3D detection body of the target object according to the optimal plane and the suboptimal plane.

In an optional example, the second unit may firstly determine a normal vector of the optimal plane and then form the pseudo 3D detection body according to an extension of vertices in the optimal plane along a direction of the normal vector. The second unit may determine the normal vector of the optimal plane in a following manner: a perpendicular line that is made from a key point in the suboptimal plane to the optimal plane is determined as the normal vector of the optimal plane. The second unit in the embodiment of the disclosure may also determine the normal vector of the optimal plane in a following manner: a perpendicular line is determined as the normal vector of the optimal plane, herein the perpendicular line is made from a key point with a greatest prediction accuracy, among remaining ones of the key points other than one or more key points corresponding to the optimal plane, to the optimal plane. The second unit in the embodiment of the disclosure may also determine the normal vector of the optimal plane in a following manner: a difference between coordinates of two key points on an edge that is in a plane adjacent to the optimal plane and is perpendicular to the optimal plane is determined as the normal vector of the optimal plane In an optional example, when the at least one key point of the target object includes multiple key points, before the 3D detection body construction module 510 performs the operation of constructing the pseudo 3D detection body, the key point selection module 540 may be configured to select one or more key points that meet a prediction accuracy requirement from among the multiple key points so that the 3D detection body construction module 510 may construct the pseudo 3D detection body of the target object according to the 2D coordinates of the at least one key point selected by the key point selection module 540.

The depth information acquisition module 520 is configured to obtain depth information of the key points.

The 3D detection body determination module 530 is configured to determine a 3D detection body of the target object according to the depth information of the key points and the pseudo 3D detection body.

In an optional example, the 3D detection body determination body module 530 may include: a third sub-module, a fourth sub-module and a fifth sub-module. The third sub-module is configured to convert the 2D coordinates of the at least one key point into 3D coordinates in a 3D space according to the depth information of the key points. For example, the third sub-module may convert the 2D coordinates of the at least one key point meeting the prediction accuracy requirement into the 3D coordinates in the 3D space. The fourth sub-module is configured to construct an initial 3D detection body of the target object according to the 3D coordinates of the at least one key point. The fifth sub-module is configured to correct the initial 3D detection body according to the pseudo 3D detection body to form the 3D detection body of the target object. For example, the fifth sub-module adjusts the initial 3D detection body in the 3D space according to the pseudo 3D detection body in a 2D plane to enlarge an overlap area between a region of the adjusted 3D detection body projected on the 2D plane and the pseudo 3D detection body. In addition, the fifth sub-module may also correct the initial 3D detection body according to a preset length-to-width-to-height ratio of the target object. The fifth sub-module may also correct the initial 3D detection body according to a bounding box of the target object in the image to be processed, so that the region of the adjusted 3D detection body projected on the 2D plane is included in the bounding box.

In an optional example, the fourth sub-module may include: a third unit, a fourth unit and a fifth unit. The third unit is configured to determine an optimal plane of the target object according to planes respectively corresponding to the 3D coordinates of the at least one key point and construct the optimal plane of the target object in the 3D space. The fourth unit is configured to determine the normal vector of the optimal plane. For example, the fourth unit determines a perpendicular line that is made from a key point in the suboptimal plane to the optimal plane as the normal vector of the optimal plane; for another example, the fourth unit determines a perpendicular line as the normal vector of the optimal plane, herein the perpendicular line is made from a key point with a greatest prediction accuracy, among remaining ones of the key points other than one or more key points corresponding to the optimal plane, to the optimal plane; for another example, the fourth unit determines a difference between coordinates of two key points on an edge that is in a plane adjacent to the optimal plane and is perpendicular to the optimal plane as the normal vector of the optimal plane. The fifth unit is configured to form the initial 3D detection body according to an extension of vertices in the optimal plane along a direction of the normal vector.

The smoothing processing module 560 is configured to perform smoothing processing on the 3D detection bodies of a same target object in multiple images to be processed that are temporally correlated. The smoothing processing in the embodiment of the disclosure may include one or more of: smoothing processing on a length, a width and a height of the 3D detection body, smoothing processing on a motion direction of the 3D detection body, smoothing processing on a central point of a bird's eye view of the 3D detection body, or smoothing processing on vertices of the 3D detection body.

The motion direction acquisition module 570 is configured to obtain a motion direction of the 3D detection body according to the 3D coordinates of the at least one key point of the target object.

The positional relationship acquisition module 580 is configured to obtain a positional relationship between the target object and a shooting device capturing the image to be processed according to the 3D coordinates of the at least one key point of the target object.

The relevant description of the above method embodiments may be referred to for the operations performed by the modules such as the 2D coordinates acquisition module 500, the 3D detection body construction module 510, the depth information acquisition module 520, the 3D detection body determination 530, the key point selection module 540, the target bounding box acquisition module 550, the smoothing processing module 560, the motion direction acquisition module 570 and the positional relationship acquisition module 580 in the embodiment of the disclosure; details will not be repeated herein.

Figure 6:
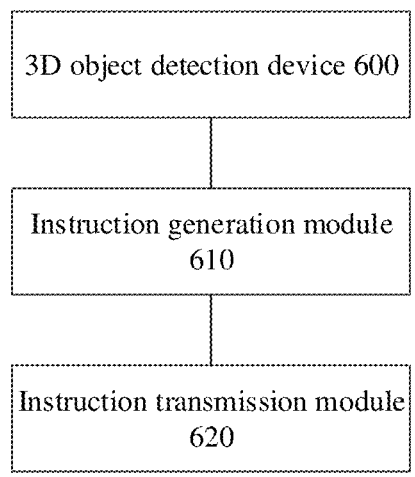
FIG. 6 is a schematic structural diagram of a device for controlling smart driving according to an embodiment of the disclosure.

FIG. 6 is a schematic structural diagram of a device for controlling smart driving according to an embodiment of the disclosure. The device in FIG. 6 mainly includes: a 3D object detection device 600, an instruction generation module 610 and an instruction transmission module 620.

The instruction generation module 610 is configured to generate a control instruction for the vehicle according to information of the 3D detection body obtained by the 3D object detection device.

The instruction transmission module 620 is configured to transmit the control instruction to the vehicle.

Description of any of the above embodiments for the 3D object detection device may be referred to for the structure of the 3D object detection device 600 and the relevant description of the above method embodiments may be referred to for the operations performed by the instruction generation module 610 and the instruction transmission module 620; details will not be repeated herein.

Figure 7:
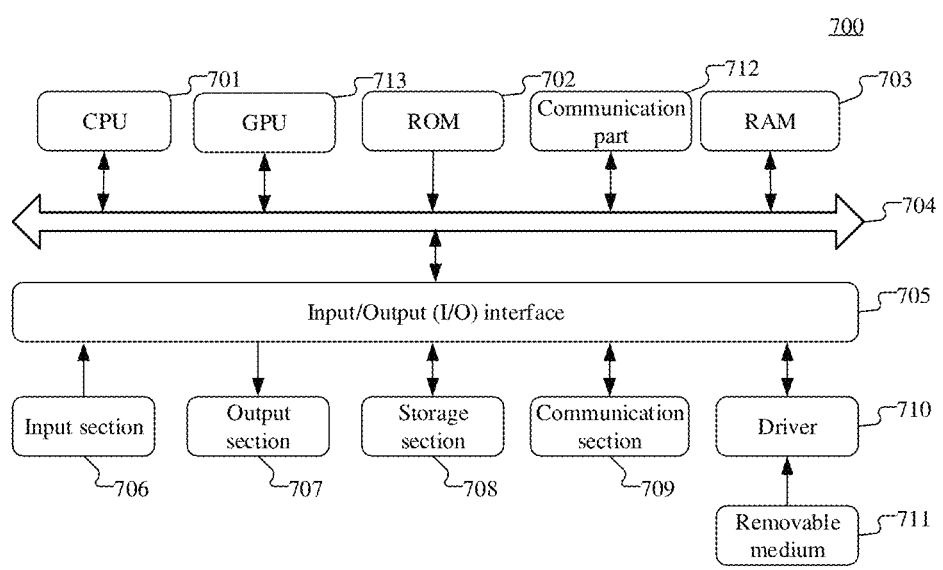
FIG. 7 is a block diagram of an exemplary device for implementing an embodiment of the disclosure.

FIG. 7 illustrates an exemplary device 700 suitable for implementing the embodiments of the present disclosure. The device 700 may be an electronic device such as a control system/an electronic system configured in a vehicle, a mobile terminal (for example, a smart mobile phone or the like), a Personal Computer (PC) (for example, a desktop computer or a notebook computer or the like), a tablet computer, a server or the like. In FIG. 7, the device 700 includes one or more processors, a communication part, and the like. The one or more processors may be one or more Central Processing Units (CPUs) 701 and/or one or more Graphic Processing Units (GPUs) 713 that perform visual tracking using a neural network and the like. The processors may perform various appropriate actions and processing according to executable instructions stored in an ROM 702 or executable instructions loaded from a storage section 708 to an RAM 703. The communication part 712 may include but is not be limited to, a network card. The network card may include, but is not be limited to, an Infiniband (IB) network card. The processor may communicate with the ROM 702 and/or the RAM 703, to execute executable instructions. The processor is connected to the communication part 712 via a bus 704, and communicates with other target devices via the communication part 712, thereby implementing operations of any 3D object detection method provided in the embodiments of the disclosure. For example, 2D coordinates of at least one key point of a target object in an image to be processed are obtained; a pseudo 3D detection body of the target object are constructed according to the 2D coordinates of the at least one key point; depth information of the key points is obtained; and a 3D detection body of the target object is determined according to the depth information of the key points and the pseudo 3D detection body. In addition, the processor may communicate with the ROM 702 and/or the RAM 703, to execute executable instructions. The processor is connected to the communication part 712 via the bus 704, and communicates with other target devices via the communication part 712, thereby implementing corresponding operations of any method for controlling smart driving provided in the embodiments of the disclosure. For example, a 3D detection body of a target object is determined using the 3D object detection method according to any embodiment of the disclosure by taking, as an image to be processed, a video frame included in a video acquired by a shooting device provided on a vehicle; a control instruction for the vehicle is generated according to information of the 3D detection body; and the control instruction is transmitted to the vehicle.

Related descriptions of the 3D object detection method or the method for controlling the smart driving according to the above embodiments may be referred to for the operations performed by each of the above instructions, which will not be elaborated herein.

In addition, the RAM 703 further may store various programs and data required for operations of an apparatus. The CPU 701, the ROM 702, and the RAM 703 are connected to each other via the bus 704. In the presence of the RAM 703, the ROM 702 is an optional module. The RAM 703 stores executable instructions, or writes the executable instructions into the ROM 702 when running. The executable instructions cause the CPU 701 to execute operations of the above 3D object detection method or the above method for controlling smart driving. An input/output (I/O) interface 705 is also connected to the bus 704. The communication part 712 may be configured integrally, and may also be configured to have multiple sub-modules (for example, multiple IB network cards) respectively connected to the bus.

The following components are connected to the I/O interface 705: an input section 706 including a keyboard, a mouse, and the like; an output section 707 including a Cathode-Ray Tube (CRT), a Liquid Crystal Display (LCD), a speaker, and the like; a storage section 708 including a hard disk and the like; and a communication section 709 of a network interface card including an Locak Area Network (LAN) card, a modem, and the like. The communication section 709 performs communication processing via a network such as the Internet. A driver 710 is also connected to the I/O interface 705 according to requirements. A removable medium 711 such as a magnetic disk, an optical disk, a magneto-optical disk, a semiconductor memory is installed on the driver 710 according to requirements, so that a computer program read from the removable medium is installed on the storage section 708 according to requirements.

It should be particularly noted that, the architecture illustrated in FIG. 7 is merely an optional implementation. During practice, the number and types of the components in FIG. 7 may be selected, decreased, increased, or replaced according to actual requirements. Different functional components may be configured respectively or integrally or the like. For example, the GPU 713 and the CPU 701 may be configured respectively. For another example, the GPU 713 may be integrated on the CPU 701, and the communication part may be configured respectively, and may also be configured integrally on the CPU 701 or the GPU 713 or the like. These alternative embodiments all fall within the scope of protection of the embodiments of the disclosure.

Particularly, according to the embodiments of the disclosure, the process described below with reference to a flowchart may be implemented as a computer software program. For example, the embodiments of the present disclosure include a computer program product, which includes a computer program tangibly included in a machine-readable medium. The computer program includes program code for performing operations shown in the flowchart. The program code may include instructions for correspondingly performing operations in the 3D object detection method or the method for controlling smart driving provided by the embodiments of the disclosure. The instructions, for example, may include an instruction of obtaining 2D coordinates of at least one key point of a target object in an image to be processed, an instruction of constructing a pseudo 3D detection body of the target object according to the 2D coordinates of the at least one key point, and an instruction of obtaining depth information of the key points, an instruction of determining a 3D detection body of the target object according to the depth information of the key points and the pseudo 3D detection body. Alternatively, the instructions may include an instruction determining a 3D detection body of a target object using the 3D object detection method according to any embodiment of the disclosure by taking, as an image to be processed, a video frame included in a video acquired by a shooting device provided on a vehicle, an instruction for generating a control instruction for the vehicle according to information of the 3D detection body and an instruction of transmitting the control instruction to the vehicle.

In such embodiments, the computer program may be downloaded and installed from the network through the communication section 709, and/or may be installed from the removable medium 711. The computer program, when being executed by the CPU 701, executes the instructions of the above corresponding operations described in the embodiments of the disclosure.

In one or more optional embodiments, a computer program product is also provided in the embodiments of the disclosure and is used to store the computer-readable instructions. When the instructions are executed, the 3D object detection method or the method for controlling smart driving in any of the above embodiments according are caused to be performed by the computer.

The computer program product may be implemented using software, hardware, or a combination of the software and the hardware. In one optional example, the computer program product is specifically embodied as a software product such as a Software Development Kit (SDK).

In one or more optional embodiments, another 3D object detection method, the method for controlling smart driving, the corresponding device, electronic apparatuses, a computer storage medium, a computer program and a computer program product are provided in the embodiments of the disclosure. The method can include following operations: a first device transmits a 3D object detection instruction or an instruction for controlling smart driving to a second device, herein the instruction enables the second device to perform the 3D object detection method or the method for controlling smart driving in any of above possible embodiments; and the first device receives a result of the 3D object detection or a result of controlling smart driving from the second device.

In some embodiments, the 3D object detection instruction or the instruction for controlling smart driving can be a specific invocation instruction. The first device can instruct the second device to perform a 3D object detection operation or an operation for controlling smart driving in a manner of invocation. Accordingly, in response to reception of the invocation instruction, the second device can perform operations and/or processes in any embodiment in the above 3D object detection method or the method for controlling smart driving.

The embodiments in the specification are all described in a progressive manner, for same or similar parts in the embodiments, refer to these embodiments, and each embodiment focuses on a difference from other embodiments. The system embodiments correspond to the method embodiments substantially and therefore are only described briefly, and for the associated part, refer to the descriptions of the method embodiments.

The methods, the devices, the electronic apparatuses and the computer-readable medium in the disclosure may be implemented in many manners. For example, the methods, the devices, the electronic apparatuses and the computer-readable media in the disclosure may be implemented with software, hardware, firmware, or any combination of software, hardware, and firmware. The foregoing sequence of the operations of the method is merely for description, and unless otherwise stated particularly, is not intended to limit the operations of the method in the disclosure. Furthermore, in some embodiments, the disclosure is also implemented as programs recorded in a recording medium. The programs include machine-readable instructions for implementing the methods according to the disclosure. Therefore, the present disclosure further covers the recording medium storing the programs for performing the methods according to the disclosure.

The descriptions of the disclosure are provided for the purpose of examples and description, and are not intended to be exhaustive or limit the disclosure to the disclosed form. Many modifications and changes are obvious to a person of ordinary skill in the art. The implementations are selected and described to better describe a principle and an actual application of the disclosure, and to make a person of ordinary skill in the art understand the embodiments of the disclosure, so as to design various implementations with various modifications applicable to particular use.

The invention claimed is:

1. A three-dimensional (3D) object detection method, comprising:
   obtaining two-dimensional (2D) coordinates of at least one key point of a target object in an image to be processed;
   constructing a pseudo 3D detection body of the target object according to the 2D coordinates of the at least one key point;
   obtaining depth information of the at least one key point; and
   determining a 3D detection body of the target object according to the depth information of the at least one key point and the pseudo 3D detection body.

2. The method of claim 1, wherein the image to be processed comprises: a video frame of a video captured by a shooting device arranged on a moving body, or a video frame of a video captured by a shooting device arranged at a fixed position, wherein the target object comprises one or more of: a motor vehicle, a non-motor vehicle, a pedestrian, an animal, a building, a plant, an obstacle, a dangerous article, a traffic sign, or an article.

3. The method of claim 1, wherein constructing the pseudo 3D detection body of the target object according to the 2D coordinates of the at least one key point comprises:
   constructing at least one possible plane of the target object according to first predetermined belonging relationships between the at least one key point and planes included by the target object and according to the 2D coordinates of the at least one key point; and
   constructing the pseudo 3D detection body of the target object according to the at least one possible plane.

4. The method of claim 3, wherein constructing the pseudo 3D detection body of the target object according to the at least one possible plane comprises:
   determining an optimal plane from among the at least one constructed possible plane according to a predetermined rule for plane quality determination; and
   constructing the pseudo 3D detection body of the target object according to the optimal plane.

5. The method of claim 4, wherein determining the optimal plane from among the at least one constructed possible plane according to the predetermined rule for plane quality determination comprises:
   determining the optimal plane and a suboptimal plane from among the at least one constructed possible plane according to the predetermined rule for plane quality determination,
   wherein constructing the pseudo 3D detection body of the target object according to the optimal plane comprises:
   constructing the pseudo 3D detection body of the target object according to the optimal plane and the suboptimal plane.

6. The method of claim 5, wherein constructing the pseudo 3D detection body of the target object according to the optimal plane and the suboptimal plane comprises:
   determining a normal vector of the optimal plane; and
   forming the pseudo 3D detection body according to an extension of vertices in the optimal plane along a direction of the normal vector.

7. The method of claim 6, wherein determining the normal vector of the optimal plane comprises:
   determining, as the normal vector of the optimal plane, a perpendicular line that is made from a key point in the suboptimal plane to the optimal plane; or
   determining a perpendicular line as the normal vector of the optimal plane, the perpendicular line being made from a key point with a greatest prediction accuracy, among remaining ones of the key points other than one or more key points corresponding to the optimal plane, to the optimal plane; or
   determining, as the normal vector of the optimal plane, a difference between coordinates of two key points on an edge that is in a plane adjacent to the optimal plane and is perpendicular to the optimal plane.

8. The method of claim 1, wherein the at least one key point of the target object includes multiple key points,
   wherein the method further comprises: before constructing the pseudo 3D detection body of the target object according to the 2D coordinates of the at least one key point,
   selecting one or more key points that meet a prediction accuracy requirement from among the multiple key points; and wherein constructing the pseudo 3D detection body of the target object according to the 2D coordinates of the at least one key point comprises:
constructing the pseudo 3D detection body of the target object according to the 2D coordinates of selected key points.

9. The method of claim 1, further comprising: before obtaining the 2D coordinates of the at least one key point of the target object in the image to be processed,
performing target object detection on the image to be processed to obtain a 2D target bounding box including the target object,
wherein obtaining the 2D coordinates of the at least one key point of the target object in the image to be processed comprises:
obtaining the 2D coordinates of the at least one key point of the target object based on an image part of the image to be processed corresponding to the 2D target bounding box.

10. The method of claim 9, further comprising:
in response to that the 2D target bounding box including the target object is not successfully obtained during the target object detection, not performing 3D detection processing on the target object.

11. The method of claim 1, wherein determining the 3D detection body of the target object according to the depth information of the at least one key point and the pseudo 3D detection body comprises:
converting the 2D coordinates of the at least one key point into 3D coordinates in a 3D space according to the depth information of the at least one key point;
constructing an initial 3D detection body of the target object according to the 3D coordinates of the at least one key point; and
correcting the initial 3D detection body according to the pseudo 3D detection body to form the 3D detection body of the target object.

12. The method of claim 11, wherein converting the 2D coordinates of the at least one key point into the 3D coordinates in the 3D space comprises:
converting the 2D coordinates of one or more key points that meet a prediction accuracy requirement into the 3D coordinates in the 3D space.

13. The method of claim 12, wherein constructing the initial 3D detection body of the target object according to the 3D coordinates of the at least one key point comprises:
determining an optimal plane of the target object according to planes respectively corresponding to the 3D coordinates of the one or more key points, and constructing the optimal plane of the target object in the 3D space;
determining a normal vector of the optimal plane; and
forming the initial 3D detection body according to an extension of vertices in the optimal plane along a direction of the normal vector.

14. The method of claim 13, wherein determining the normal vector of the optimal plane comprises:
determining, as the normal vector of the optimal plane, a perpendicular line that is made from a key point in the suboptimal plane to the optimal plane; or
determining a perpendicular line as the normal vector of the optimal plane, the perpendicular line being made from a key point with a greatest prediction accuracy, among remaining ones of the key points other than one or more key points corresponding to the optimal plane, to the optimal plane; or determining, as the normal vector of the optimal plane, a difference between coordinates of two key points on an edge that is in a plane adjacent to the optimal plane and is perpendicular to the optimal plane.

15. The method of claim 11, wherein correcting the initial 3D detection body according to the pseudo 3D detection body to form the 3D detection body of the target object comprises:
adjusting the initial 3D detection body in the 3D space according to the pseudo 3D detection body in a 2D plane to increase an overlap area between a region of the adjusted 3D detection body projected on the 2D plane and the pseudo 3D detection body.

16. The method of claim 15, wherein correcting the initial 3D detection body according to the pseudo 3D detection body to form the 3D detection body of the target object further comprises one or more of:
correcting the initial 3D detection body according to a preset length-to-width-to-height ratio of the target object; or
correcting the initial 3D detection body according to a bounding box of the target object in the image to be processed, so that the region of the adjusted 3D detection body projected on the 2D plane is included in the bounding box.

17. The method of claim 1, further comprising:
performing smoothing processing on the 3D detection bodies of a same target object in a plurality of images to be processed that are temporally correlated.

18. The method of claim 17, wherein the smoothing processing comprises one or more of: smoothing processing on a length, a width and a height of the 3D detection body, smoothing processing on a motion direction of the 3D detection body, smoothing processing on a central point of a bird's eye view of the 3D detection body, or smoothing processing on vertices of the 3D detection body.

19. An electronic device comprising:
a memory configured to store a computer program; and
a processor configured to execute the computer program stored in the memory, wherein when the computer program is executed, the processor is caused to implement a three-dimensional (3D) object detection method, the method comprising:
obtaining two-dimensional (2D) coordinates of at least one key point of a target object in an image to be processed;
constructing a pseudo three-dimensional (3D) detection body of the target object according to the 2D coordinates of the at least one key point;
obtaining depth information of the at least one key point; and
determining a 3D detection body of the target object according to the depth information of the at least one key point and the pseudo 3D detection body.

20. A non-transitory computer-readable storage medium having stored thereon a computer program that, when executed by a processor, causes a three-dimensional (3D) object detection method to be implemented, the method comprising:
obtaining two-dimensional (2D) coordinates of at least one key point of a target object in an image to be processed;
constructing a pseudo three-dimensional (3D) detection body of the target object according to the 2D coordinates of the at least one key point;
obtaining depth information of the at least one key point; and determining a 3D detection body of the target object according to the depth information of the at least one key point and the pseudo 3D detection body.

* * * * *